(12) United States Patent
Giertz

(10) Patent No.: US 7,165,891 B2
(45) Date of Patent: Jan. 23, 2007

(54) GUIDE ROLLER ASSEMBLY FOR A CONTINUOUS CASTING PLANT

(75) Inventor: Klaus Giertz, Bochum (DE)

(73) Assignee: SMS Demag AG, Dusseldorf (DE)

( * ) Notice: Subject to any disclaimer, the term of this patent is extended or adjusted under 35 U.S.C. 154(b) by 0 days.

(21) Appl. No.: 10/391,301

(22) Filed: Mar. 18, 2003

(65) Prior Publication Data

US 2003/0223663 A1  Dec. 4, 2003

(30) Foreign Application Priority Data

Mar. 19, 2002 (DE) .................. 102 12 056

(51) Int. Cl.
  *F16C 13/02* (2006.01)
  *F16C 33/74* (2006.01)
(52) U.S. Cl. .................. 384/418; 384/129; 384/144; 384/317
(58) Field of Classification Search ............. 384/91, 384/100, 114, 119, 129, 130, 144, 416, 418, 384/419, 477, 317, 321; 492/39; 164/448
See application file for complete search history.

(56) References Cited

U.S. PATENT DOCUMENTS

| 3,965,974 A | * | 6/1976 | Sernetz et al. ............... 164/448 |
| 4,000,553 A | | 1/1977 | Spannlang et al. ........... 29/115 |
| 4,164,252 A | | 8/1979 | Scheurecker ................. 164/448 |
| 4,883,369 A | * | 11/1989 | Jude et al. ................... 384/476 |
| 5,186,547 A | * | 2/1993 | Muhl et al. .................. 384/480 |
| 5,490,730 A | * | 2/1996 | Akita et al. .................. 384/147 |
| 5,649,889 A | * | 7/1997 | Warner, III .................. 492/16 |
| 5,971,622 A | * | 10/1999 | Akazawa ..................... 384/558 |
| RE36,405 E | * | 11/1999 | Akita et al. .................. 384/147 |

FOREIGN PATENT DOCUMENTS

| DE | 2911624 | 9/1980 |
| DE | 3228175 | 3/1983 |
| FR | 2545891 | 11/1984 |

* cited by examiner

*Primary Examiner*—Thomas R. Hannon
(74) *Attorney, Agent, or Firm*—Abelman, Frayne & Schwab

(57) ABSTRACT

A guide roller assembly includes a guide roller and a bearing that supports the roller body of the guide roller and is formed as a ring-shaped, segmented slide bearing.

4 Claims, 2 Drawing Sheets

GUIDE ROLLER ASSEMBLY FOR A CONTINUOUS CASTING PLANT

BACKGROUND OF THE INVENTION

1. Field of the Invention

The present invention relates to a guide roller assembly including a guide roller having a roller body about which a roller shell is concentrically arranged, and a bearing for supporting the roller body.

2. Description of the Prior Art

In continuous casting plants, in addition to guide rollers supported at their opposite ends, guide rollers, which have additional supports, are used. The guide rollers with multiple supports permit to cast strands having an increased width, and at an increased speed. A guide roller with multiple supports is disclosed, e.g., in German Publication DE 197 16 562A1. A guide roller of a continuous casting plant is subjected to high mechanical alternating stresses as a result of a pressure acting on the strand, and to particularly high thermal stresses as a result of its contact with the hot strand. To reduce the thermal stresses, the guide rollers are usually cooled with water. Despite cooling, still, a thermal overstress of the guide roller and, thus, of its body and shell, and of the supporting bearing can occur.

Usually, for supporting the guide rollers, roller bearing are used. For lubricating the bearings, an annular space is provided around a bearing and is filled with a lubricant. As a result of the thermal overstress, the bearing can be dried-up and blocked. Moreover, the roller bearing is particularly shock-sensitive. A bearing, which is located at a point of the guide roller, at which because of the weight of the guide roller and the pressure applied by the strand, deflection of the guide roller takes place and, as a result, a high mechanical load is generated, is subjected to particularly high shock and thermal loads or stresses.

Accordingly, an object of the invention is to provide a guide roller assembly which would be particularly wear-resistant and soiling-resistant.

SUMMARY OF THE INVENTION

This and other objects of the present invention, which will become apparent hereinafter, are achieved by providing a guide roller assembly in which the bearing that supports the roller body, is formed as a ring-shaped, segmented slide bearing.

The provision of a ring-shaped, segmented slide bearing permitted to achieve a most possible wear-resistant support of a guide roller with an increased operational durability, together with a most possible insusceptibility of the bearing to shocks and soiling. The use of the slide bearing permitted to reduce damage of the material caused by soiling which, on one hand, contributes to wear and, on the other hand, increases the play between the component and, thus, the shock loads. To reduce the damage of the material, a very tight support of the roller body should be provided. At that, a most possible formlocking support of the roller body also should be provided. A slide bearing, with large effective surfaces movable relative to each other, provides for a most possible force transmission. Further, a slide bearing formlockingly engage the roller body. In order to reduce the friction, which is caused at such flat and slidable support by loads applied to the effective areas, a lubricant or a pressurized fluid is introduced between the effective surfaces.

Advantageously, the slide bearing is formed of two half-shells. This insures a particularly easy mounting and dismounting of the slide bearing about the roller body which can be formed as a one-piece or multi-piece part. For sealing the slide bearing with respect to the roller body, at least one seal is provided between the slide bearing and the roller body. In a particularly advantageous embodiment, the seal is formed as a lamella ring or as a labyrinth seal. Dependent on the requirement, the lamella ring or the labyrinth seal can have one or several helical rings or coils. With such a sealing of the annular space, in which the lubricant circulates or is stored, the consumption of the lubricant is reduced to a most possible extent.

Advantageously, the ring-shaped, segmented slide bearing is arranged, viewed in the longitudinal direction of the guide roller, in a middle of the roller body. This insures that a most possible shock-resistant and soiling resistant support of the roller body occurs at a location at which a greatest possible line load acts on the roller body and the bearing that supports the roller body at this location.

The advantages, which are achieved by the present invention, consist in particular in that the ring-shaped, segmented slide bearing, which is provided for supporting the roller body, insures a particularly good formlocking engagement with the roller body, which, in turn, provides for a reliable protection against impurities and, thus, a particular high soling resistance. In addition, the formlocking engagement of the slide bearing with the roller body insures a most effective force transmission which provides for a particularly good shock-resistance of the bearing, i.e., its insusceptibility to shocks. The slide bearing provides for a high quality sliding support of the roller body and a comparatively long operational durability even in an extremely contaminated atmosphere. Further, as it has already been mentioned above, a ring-shaped segment arrangement of the slide bearing about the roller body insures a rapid and simple mounting of the bearing.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
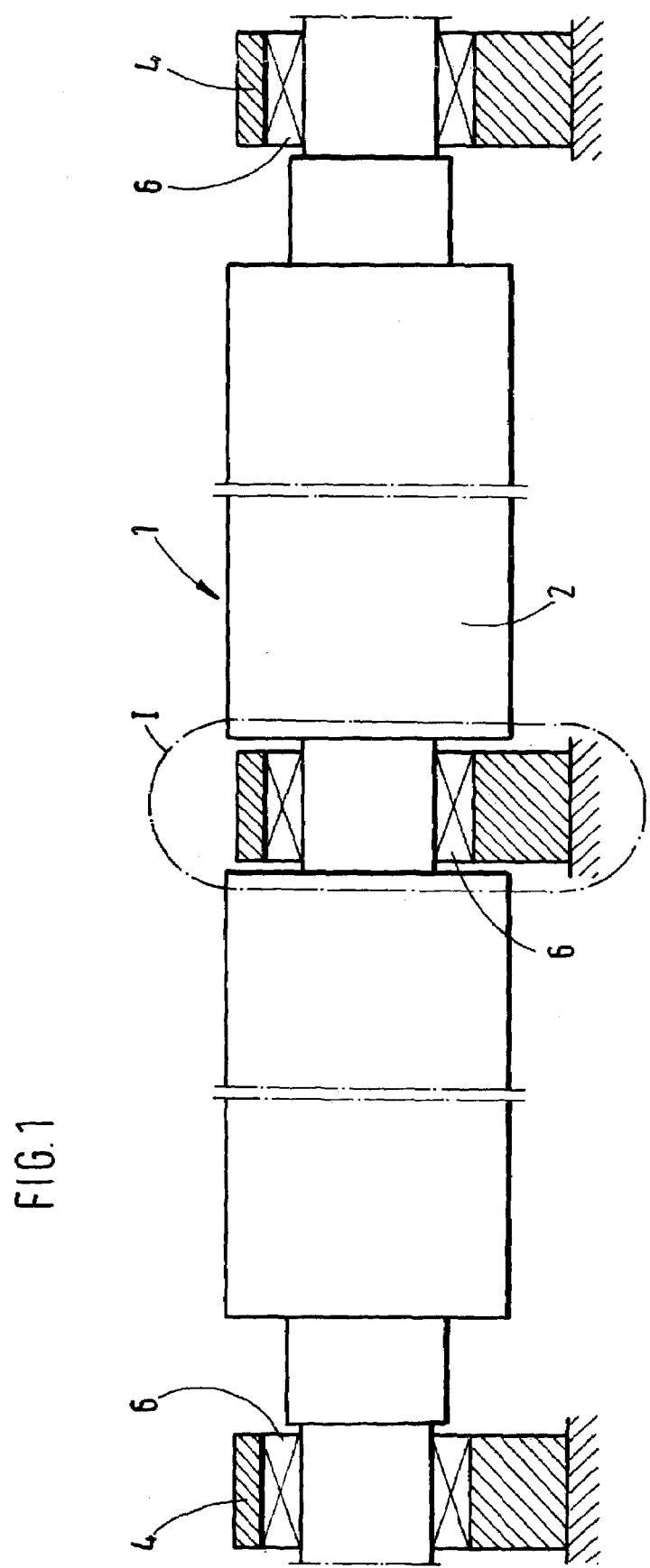
FIG. 1 a schematic, partially cross-sectional view of a guide roller according to the present invention for a continuous casting plant with bearing for supporting the guide roller.

A guide roller 1 according to the present invention, which is shown in FIG. 1, has a roller body 2 concentrically surrounded by a roller shell. Dependent on the type of the guide roller, the roller body and the roller shell can be formed as a one-piece part or be formed as several parts. For supporting the guide roller 1, two bearing 6 are provided at the opposite ends of the guide roller 1 and one bearing 6 is provided in the middle of the longitudinal extent of the guide roller 1. The bearings 6 are located each in a bearing housing 4.

Figure 2:
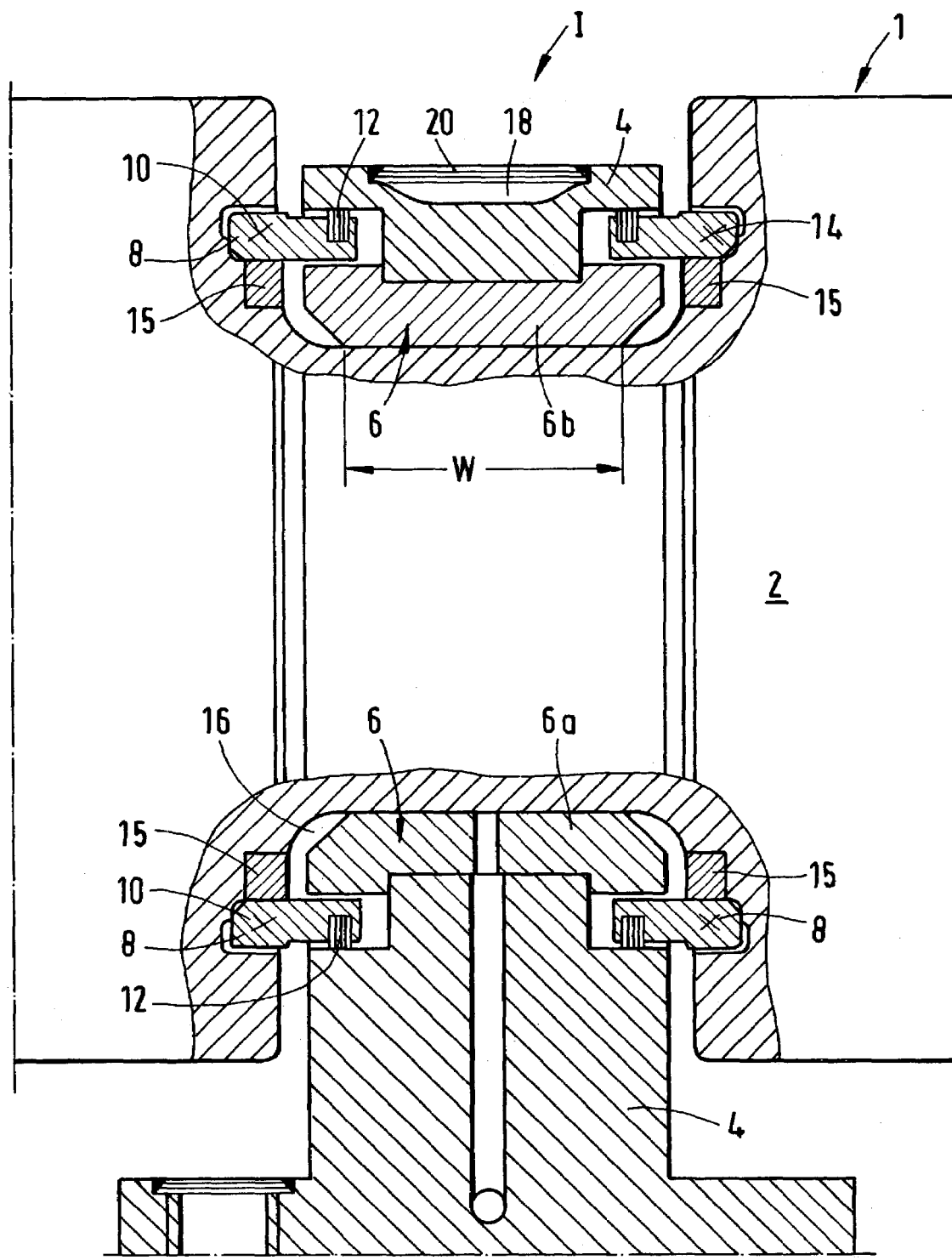
FIG. 2 a cross-sectional view of a section of guide roller shown in FIG. 1 taken along a longitudinal extend of the guide roller.

FIG. 2 show in detail the section I in FIG. 1 which includes the middle bearing 6 which would be described in detail below. To provide for as good as possible insusceptibility to shocks and dirt, the bearing 6 is formed as a ring-shaped, segmented, slide bearing. Advantageously, the bearing 6 is formed of two half-shells 6a and 6b which surround the roller body 2. The two half-shells 6a and 6b of the bearing 6 are connected with each other, e.g., by screws. The bearing 6 is arranged in the bearing housing 4 that likewise can be formed as a segmented part. For sealing the bearing 6 with respect to the roller body 2, a circumferential seal 8 is provided between the bearing 6 and the roller body 2. The ring-shaped seal 8 is advantageously formed as a labyrinth seal. This means that the seal 8, which is arranged in a ring 10, is formed by at least one circumferential coil 12 that serves as a sealing lip. The seal 8 is also called lamella ring. The halves of the ring 10 are connected with each other, e.g., by screws 14. However, other type of fastening elements can be used. Within the ring 10, a retaining ring 15 is arranged.

The retaining ring 15 provides for compensation for a recess or a hollow in the rolled body 2. With another type of mounting, the retaining ring can be eliminated, if necessary.

During the operation of the continuous casting plant, the bearing 6, which is formed as a slide bearing, insures a formlocking support of the roller body 2 to a most possible extent, which permits to form the effective force-transmitting area W as large as possible. For lubrication of the bearing 6, an annular space 16 is formed between the bearing 6 and the roller body 2. The lubricant is store in this space.

For cooling the bearing assembly, the bearing 6 and the bearing housing 4, which is subjected to very high thermal loads, a milled-out recess or groove 18 is formed in the bearing housing 4, through which groove 18 a cooling medium, e.g., water can flow. The groove 18 forms a cooling channel covered with a plate 20 to prevent soiling. However, the roller body 2 can be cooled otherwise, dependent on type of the continuous casting plant.

Though the present invention was shown and described with references to the preferred embodiments, such are merely illustrative of the present invention and are not to be construed as a limitation thereof and various modification or the present invention will apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A guide roller assembly for use in continuous casting plants for supporting cast strands, the guide roller assembly comprising a guide roller having a roller body; and at least one bearing for supporting the roller body and formed as a ring-shaped, segmented slide bearing, wherein the bearing is arranged, viewed in a longitudinal direction of the guide roller, in a middle of the roller body, and wherein the bearing is provided with a cooling channel for feeding cooling medium to the bearing.

2. A guide roller assembly as set forth in claim 1, wherein the slide bearing is formed of two half-shells.

3. A guide roller assembly as set forth in claim 1, further comprising at least one circumferential seal provided between the slide bearing and the roller body.

4. A guide roller assembly as set forth in claim 3, wherein the at least one seal is formed as a labyrinth seal.

* * * * *